(12) United States Patent
Augustine et al.

(10) Patent No.: US 7,956,308 B2
(45) Date of Patent: Jun. 7, 2011

(54) WELD GUN CONTROL SYSTEM

(75) Inventors: Paxton C. Augustine, Kalamazoo, MI (US); Mike G. Parran, Portage, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 909 days.

(21) Appl. No.: 11/419,116

(22) Filed: May 18, 2006

(65) Prior Publication Data
US 2007/0000882 A1 Jan. 4, 2007

Related U.S. Application Data (60) Provisional application No. 60/682,197, filed on May 18, 2005.

(51) Int. Cl.
*B23K 11/00* (2006.01)
(52) U.S. Cl. .... 219/89; 219/91.2; 219/86.51; 219/86.25
(58) Field of Classification Search .................... 219/81, 219/83, 89, 91.2, 86.25
See application file for complete search history.

(56) References Cited

U.S. PATENT DOCUMENTS

| | | | | |
|---|---|---|---|---|
| 3,497,660 A * | 2/1970 | Henry-Biabaud | .............. | 219/89 |
| 5,032,704 A * | 7/1991 | Neff et al. | .................... | 219/89 |
| 5,412,172 A | 5/1995 | Ichikawa et al. | | |
| 6,268,581 B1 * | 7/2001 | Nakamura et al. | .............. | 219/81 |
| 6,455,800 B1 | 9/2002 | Janssens et al. | | |
| 6,633,015 B2 | 10/2003 | Nguyen et al. | | |
| 6,722,257 B2 * | 4/2004 | Yoh et al. | ........................ | 91/408 |
| 6,799,501 B2 | 10/2004 | Yo et al. | | |
| 2003/0154797 A1 * | 8/2003 | Helliker et al. | ................. | 73/744 |
| 2004/0182231 A1 | 9/2004 | Yo et al. | | |

FOREIGN PATENT DOCUMENTS

| | | |
|---|---|---|
| EP | 0 907 454 B1 | 5/2003 |
| JP | 08309553 A | * 11/1996 |
| WO | 97/41993 | 11/1997 |

OTHER PUBLICATIONS

Machine translation of JP 08309553 A, Nov. 2010.*
Pneumatic Spotwelding Control Systems Training & Maintenance Manual; May 2006, pp. 1-20.

* cited by examiner

*Primary Examiner* — Quang T Van
*Assistant Examiner* — Jianying Atkisson
(74) *Attorney, Agent, or Firm* — Renner, Otto, Boisselle & Sklar, LLP (57) ABSTRACT

A system and method for controlling a piston-cylinder assembly of a welding apparatus, the piston-cylinder assembly including a plurality of pressure chambers, wherein the piston-cylinder assembly is operatively coupled to at least one welding electrode of the welding apparatus so as to effect movement of the electrode in a pre-stroke and weld motion, comprises: connecting to a first port of the piston-cylinder assembly a first fluid pressure, the first port in communication with a first pressure chamber so as to effect the pre-stroke motion of the electrode; and connecting to a second port of the piston-cylinder assembly a second fluid pressure, the second port in communication with a second pressure chamber so as to effect the weld stroke motion of the electrode, wherein the second fluid pressure is different from the first fluid pressure.

6 Claims, 12 Drawing Sheets

WELD GUN CONTROL SYSTEM

RELATED APPLICATION DATA

This application claims priority of U.S. Provisional Application No. 60/682,197 filed on May 18, 2005, which is incorporated herein by reference in its entirety.

FIELD OF THE INVENTION

The present invention relates generally to spot welding and, more particularly, to a control system for operating a piston-cylinder assembly of a spot welding gun.

BACKGROUND OF THE INVENTION

Pneumatic piston-cylinder assemblies are generally known and have utility in a number of different applications. For example, welding systems, such as spot welding guns, employ pneumatic piston-cylinder assemblies to move and hold electrodes at a desired location during a welding operation. As is well known by those having ordinary skill in the art, spot welding is a form of welding wherein a work piece (e.g., two or more pieces of metal) are joined by passing a current between electrodes positioned on opposite sides of the metal pieces. The actual weld is made by the combination of: a) heat generated as the current passes through the metal; b) the pressure applied to the pieces at the weld location; and c) the time the heat and pressure are applied at the weld location.

Conventional control systems for spot welding guns, for example, utilize a single pressure source providing a common pressure for effecting motion of the piston-cylinder assembly. Such systems are referred to herein as single pressure systems. The pneumatic pressure from the pressure source, via control valves, is provided to different pressure chambers of the piston-cylinder assembly to effect one of several motions, e.g., a pre-stroke motion or a weld stroke motion.

As used herein, pre-stroke (or retract stroke) refers to the motion of the electrodes from an initial starting position to an intermediate position (or from intermediate position to starting position), wherein the tips of the welding apparatus may be near but not contacting the work piece. A weld stroke refers to the motion of the tips from the intermediate position to contact with the work piece, and a return motion refers to the motion from contact with the work piece to the intermediate position.

Typically, a first control valve controls pneumatic pressure to a first pressure chamber of the piston-cylinder assembly so as to effect the pre-stroke motion, while a second control valve controls pneumatic pressure to a second pressure chamber of the piston-cylinder assembly so as to effect the weld motion. Alternatively, individual piston-cylinder assemblies (e.g., separate and distinct assemblies) may be employed (e.g., one for the pre-stroke motion and one for the weld motion), wherein each valve controls pneumatic pressure to a respective piston-cylinder assembly. In both scenarios, however, the systems are single pressure systems.

In manufacturing environments, it is desirable to increase the speed at which processes occur so as to increase productivity. For example, during the assembly of an automobile or a component of an automobile, there may be a number of spot welds applied to the automobile/component. If the cycle time for each spot weld can be reduced, then more automobiles/components can be processed, thereby increasing productivity. Thus, it is desirable to move the electrode tips of the spot welding gun as fast as possible so as to minimize cycle times and increase productivity. However, bringing the electrode tips in contact with the work piece at a relatively high rate of speed can cause the tips to bounce off the work piece, which can shorten the life of the tips and/or reduce the quality of the weld.

To minimize the bounce of the electrode tips as they contact the work piece, it is preferable that the tips approach the work piece at a relatively slow speed. However, this tends to slow the overall cycle time of the welding process, which is undesirable. Further, to enhance the strength and/or quality of the weld, it is desirable to apply a significant force to the work piece at the weld location. The force can be created, for example, by applying relatively high pneumatic pressure to the piston-cylinder assembly. However, this high pressure can take considerable time to build up and/or remove from the piston-cylinder assembly, thereby slowing the cycle time of the welding operation, which also is undesirable.

As is evident, a dilemma exists between increasing productivity and enhancing quality of the spot weld. If one chooses to increase the quality of the weld and/or reduce electrode bounce, productivity suffers. Similarly, if one chooses to increase speed to enhance productivity, electrode bounce is increased and weld quality is reduced.

SUMMARY OF THE INVENTION

The present invention provides control system and method that enables cycle times for a spot welding gun to be reduced relative to conventional approaches, thereby increasing productivity. Further, the tips may be brought into contact with the work piece with low impact, thereby enhancing life of the tips. The invention implements a dual pressure control scheme, which enables the use of high pressure during both pre-stroke motions (i.e., extend and retract) and during the weld stroke return motion of the piston-cylinder assembly (thus providing high speed motion), and lower pressure during welding motions of the piston-cylinder assembly (e.g., to control a force applied to the work piece). Additionally, the invention can include a quick exhaust valve to optimize performance of spot welding gun. The quick exhaust valve enables pneumatic pressure on a front side of the pistons to be metered or dumped during pre-stroke, which allows the piston to move into the pre-stroke position quicker relative to conventional systems, which can further reduce cycle times.

According to one aspect of the invention, there is provided a method of controlling a piston-cylinder assembly for a welding apparatus, said piston-cylinder assembly including a plurality of pressure chambers, wherein said piston-cylinder assembly is operatively coupled to at least one welding electrode of said welding apparatus so as to effect movement of said electrode in a pre-stroke and weld motion, comprising: connecting to a first port of the piston-cylinder assembly a first fluid pressure, said first port in communication with a first chamber so as to effect the pre-stroke motion of the electrode; and connecting to a second port of the piston-cylinder assembly a second fluid pressure, said second port in communication with a second chamber so as to effect the weld stroke motion of the electrode, wherein the second fluid pressure is different from the first fluid pressure.

According to another aspect of the invention, there is provided a system for operating a piston-cylinder assembly for a welding apparatus, said piston-cylinder assembly including a plurality of pressure chambers, wherein said piston-cylinder is operatively coupled to at least one welding electrode of said welding apparatus so as to effect movement of said electrode in a pre-stroke and a weld motion, comprising: a first fluid pressure source for providing a first fluid pressure; a second fluid pressure source for providing a second fluid pressure, wherein the second fluid pressure is less than the first fluid pressure; a third fluid pressure source for providing a third fluid pressure, wherein the third fluid pressure is less than the second fluid pressure; a first valve coupled to a first pressure chamber and operative to selectively provide the first fluid pressure or third fluid pressure to the first pressure chamber; a second valve coupled to a second pressure chamber and operative to selectively provide the second fluid pressure or third fluid pressure to the second pressure chamber.

According to another aspect of the invention, there is provided a welding apparatus, comprising: a plurality of welding electrodes; a piston-cylinder assembly including a plurality of pressure chambers, wherein said piston-cylinder assembly is operatively coupled to at least one of the welding electrodes so as to effect movement of said electrode in a pre-stroke and weld motion; a first valve coupled to a first pressure chamber and operative to selectively provide a first fluid pressure or a third fluid pressure to the first pressure chamber; and a second valve coupled to a second pressure chamber and operative to selectively provide a second fluid pressure or the third fluid pressure to the second pressure chamber.

According to another aspect to the invention, there is provided a method of controlling a piston-cylinder assembly for a welding apparatus, said welding apparatus including a pre-stroke motion and a weld motion, comprising: connecting a first fluid pressure source to the piston-cylinder assembly to effect the pre-stroke motion; and connecting a second fluid pressure to the piston-cylinder assembly to effect the weld stroke motion, wherein the second pressure less than the first pressure.

According to another aspect of the invention, there is provided a method of controlling a piston-cylinder assembly for a welding apparatus, said piston-cylinder assembly including a first pressure chamber, a second pressure chamber, and a third pressure chamber, wherein said piston-cylinder assembly is operatively coupled to at least one welding electrode of said welding apparatus so as to effect movement of said electrode in a pre-stroke and weld motion, comprising: dumping an exhaust pressure from the third pressure chamber during the pre-stroke motion; and dumping an exhaust pressure from the third pressure chamber when a clamping force applied by the electrodes on a work piece is satisfies a predetermined threshold.

According to another aspect of the invention, a quick exhaust assembly for use with a piston-cylinder assembly to which at least one welding electrode is connected for movement toward and away from a part to be welded, said quick exhaust assembly including a first port for connection to a retract chamber of the piston-cylinder assembly; a second port for connection to an extend chamber of the piston-cylinder assembly; a third port for dumping fluid from the first port; a fourth port for metering fluid from the first port chamber; a first valve operable in a first position to connect the first port to the third port, and in a second position to connect the first port to the fourth port; a second valve operable in a first position to direct the first valve to the first position so as to couple the first port to the third port, and operable in a second position to direct the first valve to the second position so as to couple the first port to the fourth port; and a timer circuit connected to the second port and the second valve, wherein the timer circuit is operable to direct the second valve to the second position a predetermined time after pressure is detected at the second port.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

BRIEF DESCRIPTION OF THE DRAWINGS

The forgoing and other embodiments of the invention are hereinafter discussed with reference to the drawings.

DETAILED DESCRIPTION

The invention will now be described in more detail with respect to several embodiments. Because the invention was conceived and developed for use in pneumatic spot welding systems, it will be herein described chiefly in this context. However, the principles of the invention in their broader aspects can be adapted to other types of welding systems, such as hydraulically driven systems, for example.

As used herein, the term "dump" refers to the exhaust of a fluid without intentional restriction of the fluid flow. For example, fluid that passes through a muffling device that causes some flow restriction prior to the fluid being released into ambient air may be considered as unrestricted flow, since the restriction from the muffling device is to suppress sound, and not to intentionally restrict fluid flow. The term "metering" or "metered" refers to a controlled or regulated flow of a fluid.

Figure 1:
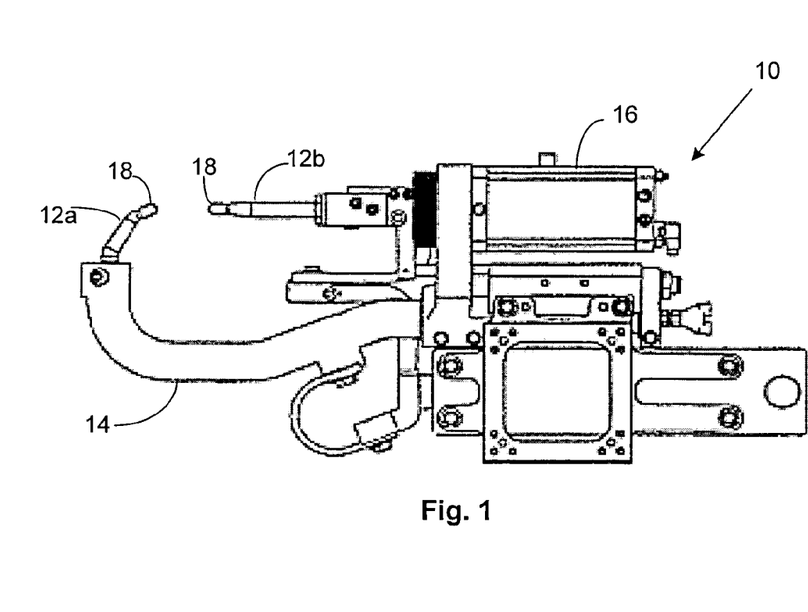
FIG. 1 is a side view of a conventional spot welding gun that can be used in conjunction with the invention.

Referring initially to FIG. 1, there is shown a side view of an exemplary C-arm spot welding gun 10 that may be used in conjunction with the present invention. As will be appreciated, there are a number of different welding gun configurations that may be used, and the example of FIG. 1 is not intended to be limiting in any way. For example, the spot welding gun may be a pinch, scissor, x-gun, or any other type of welding gun used in spot welding applications. The exemplary spot welding gun 10 includes a fixed electrode 12a coupled to a support arm 14, and a moveable electrode 12b coupled to an actuator 16, such as a piston-cylinder assembly, for example. The actuator 16 may include two, three, four or more pressure chambers, and one or more pistons. Located at the end of each electrode 12a and 12b are welding tips 18, which make contact with a work piece during a welding operation.

For example, a work piece, such as two pieces of metal (not shown) may be placed between the electrode tips 18. A pre-stroke (retract) valve is energized, which provides full line pressure to effect motion of the piston-cylinder assembly 16 from a start position to an intermediate position (pre-stroke position). Further, a quick exhaust valve removes pressure from a front side of the piston-cylinder assembly 16 during pre-stroke motion. The combination of full line pressure on the back side of the piston and little or no pressure on the front side of the piston enables the piston-cylinder assembly to quickly extend the electrodes into the pre-stroke position. A weld stroke valve then is energized using a selected weld schedule pressure, which may be different from the full line pressure (typically less than full line pressure), and the piston cylinder assembly moves the electrodes from the intermediate position to the weld position. The closure speed of the weld tips 18 is controlled by an adjustable flow control, thus enabling a low impact between the tips 18 and the work piece as they contact each other. Immediately following weld tip contact with the work piece, two actions take place. A pressure sensing proportional/quick dump valve allows the front end of the piston-cylinder assembly 16 to dump (by-passing the flow control), thereby providing weld schedule pressure instantly. Additionally, the proportional/quick dump valve also actuates a feedback sensor to signal that the weld cycle may be initiated. Once the weld cycle is complete, the weld stroke valve is de-energized, allowing the weld tips to open under full line pressure. Then, the retract (pre-stroke) valve is de-energized, allowing the piston-cylinder assembly 16 to open completely under full line pressure.

Figure 2:
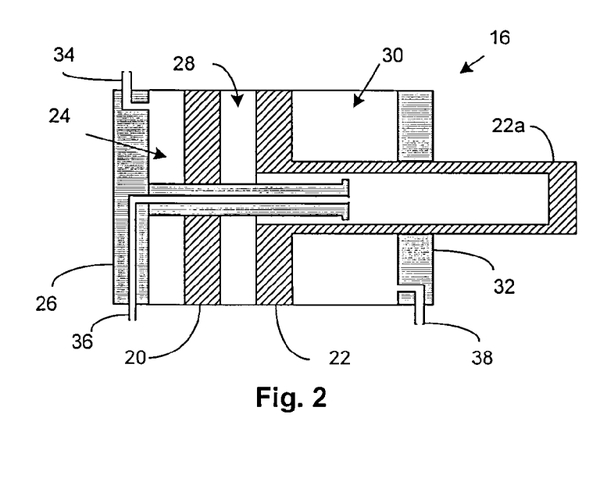
FIG. 2 is side schematic view of a piston-cylinder assembly that can be used in conjunction with the invention.

FIG. 2 illustrates an exemplary "three-port" piston-cylinder assembly 16 that may be used in conjunction with the invention. While the invention will be described herein with respect to a three-port piston cylinder assembly, it will be appreciated that features of the invention also may be applied to other types of piston-cylinder assemblies (e.g., two-port or four port piston-cylinder assemblies). The piston-cylinder assembly 16 includes a first piston 20 and a second piston 22. A first pressure chamber 24 is defined between a back wall 26 of the actuator 16 and the first piston 20. A second pressure chamber 28 is defined between the first piston 20 and the second piston 22, and a third pressure chamber 30 is defined between the second piston 22 and a front wall 32 of the actuator 16. A piston rod 22a couples the piston-cylinder assembly 16 to a device, such as the electrode 12b of the welding gun 10. First port 34, second port 36 and third port 38 are in communication with the first pressure chamber 24, second pressure chamber 28 and third pressure chamber 30, respectively.

By using dual pressure, a lower "regulated" pressure can be used for the weld stroke, which can provide improved control of the weld force applied to the work piece. Additionally, the regulated pressure can be used during tip dressing, which can reduce the likelihood of stalling a tip dresser motor. Further, the high pressure can be used for the pre-stroke (retract) and weld stroke return motion to effect high speed operation, thereby reducing cycle times. The high pressure also minimizes the likelihood of sticking (i.e., the tips sticking to the work piece) once the weld cycle is complete.

Figure 3A:
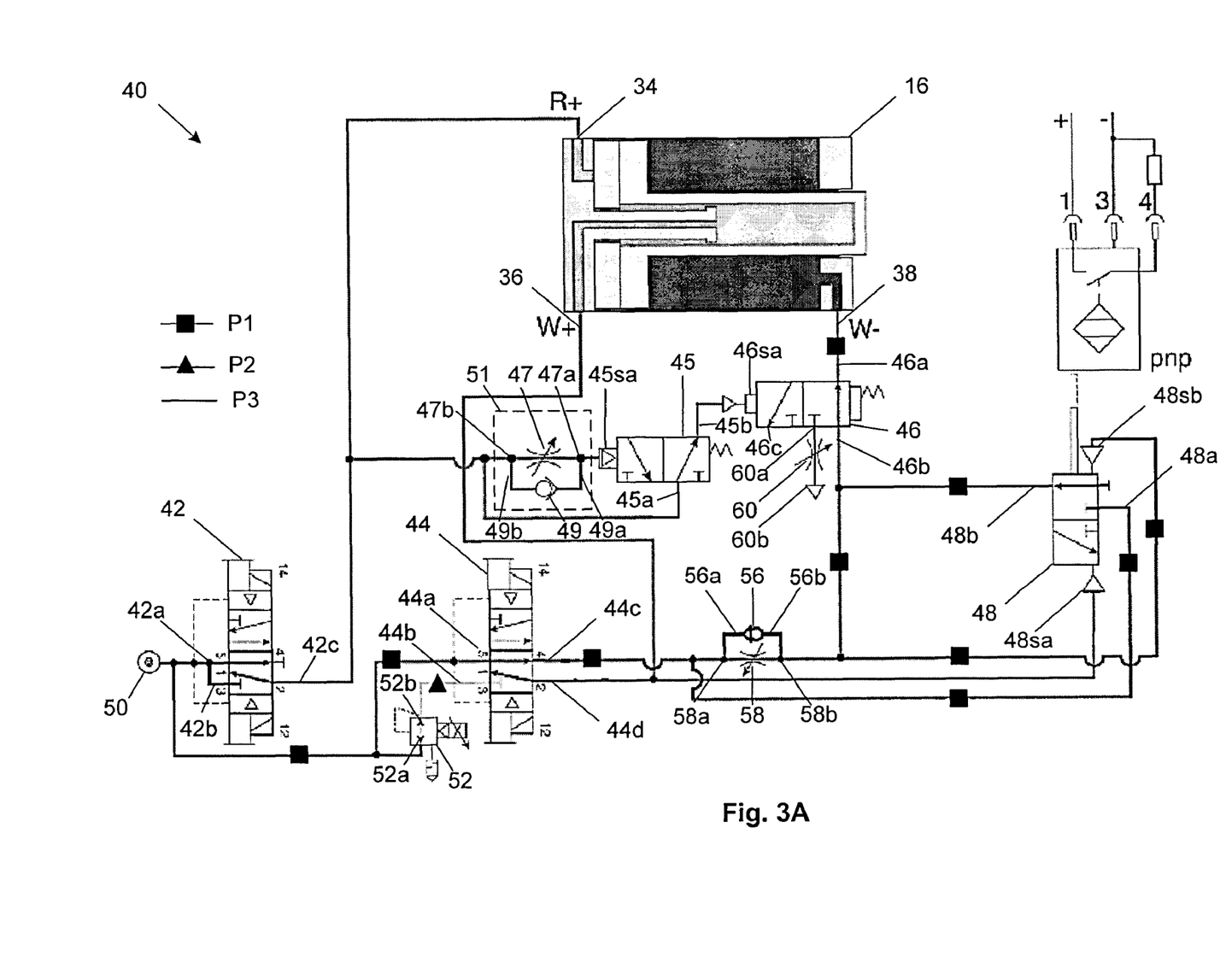
FIGS. 3A-3J are exemplary schematic diagrams illustrating a control system for operating a spot-welding gun in accordance with the invention.
Figure 3B:
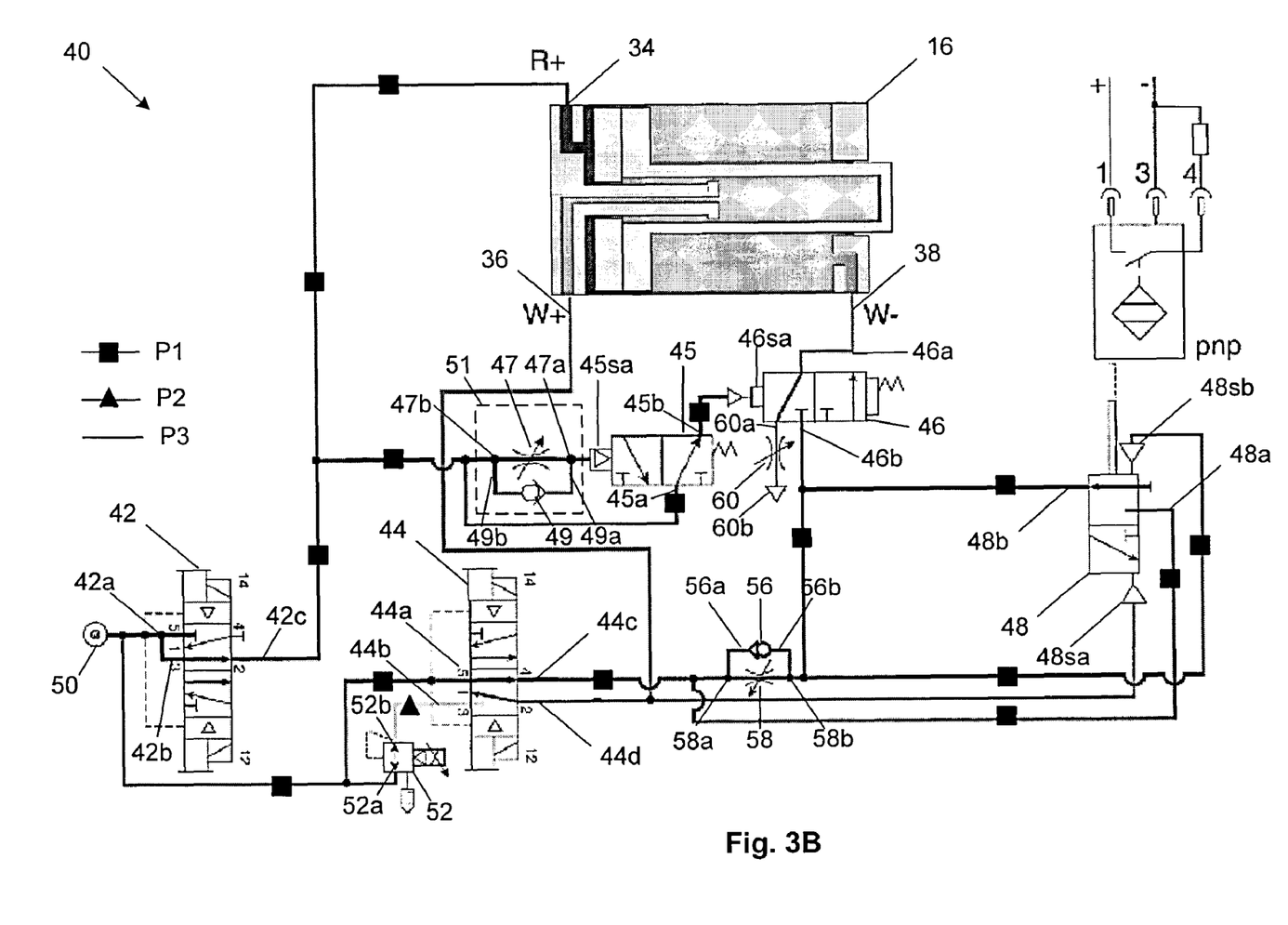
Figure 3C:
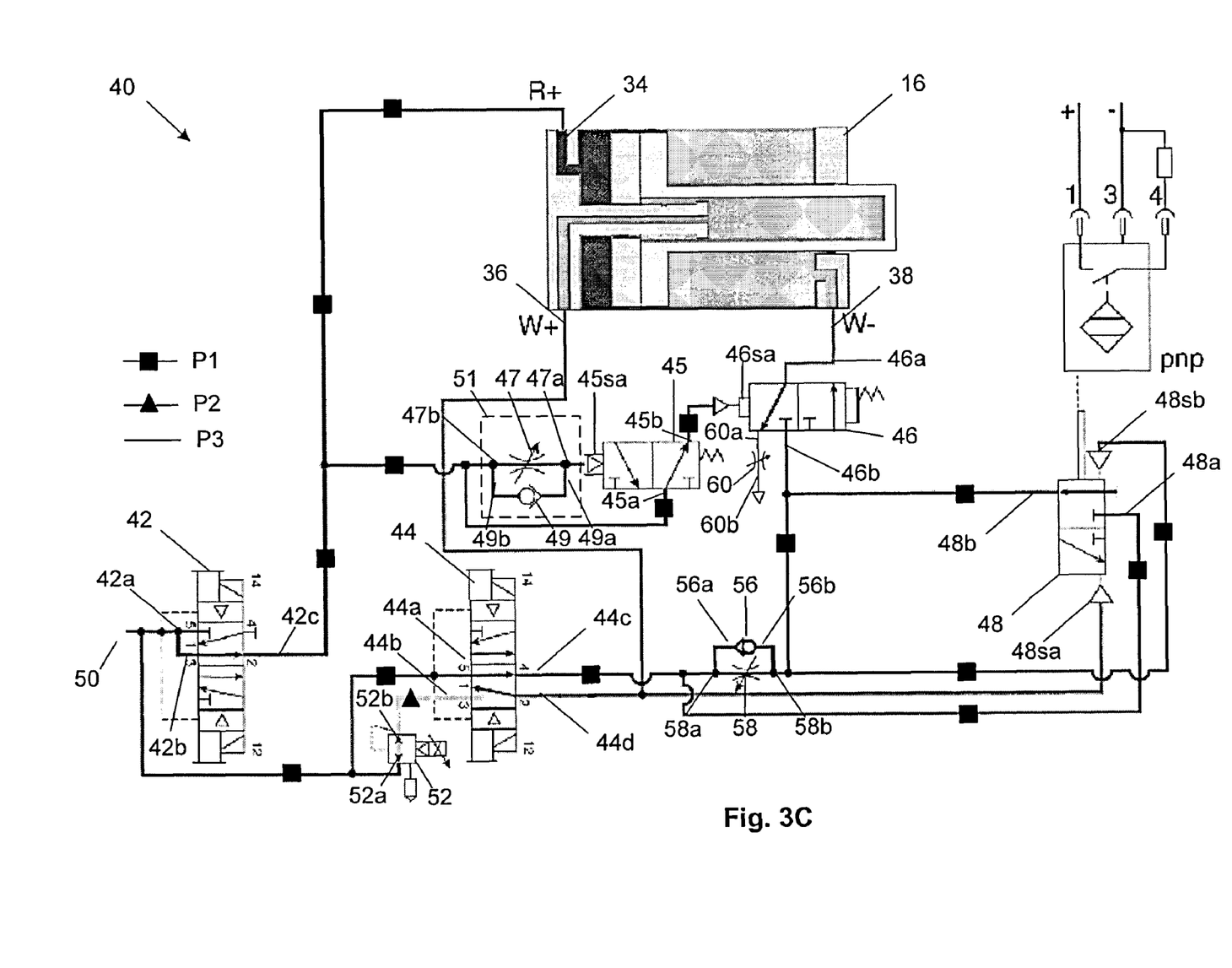
Figure 3D:
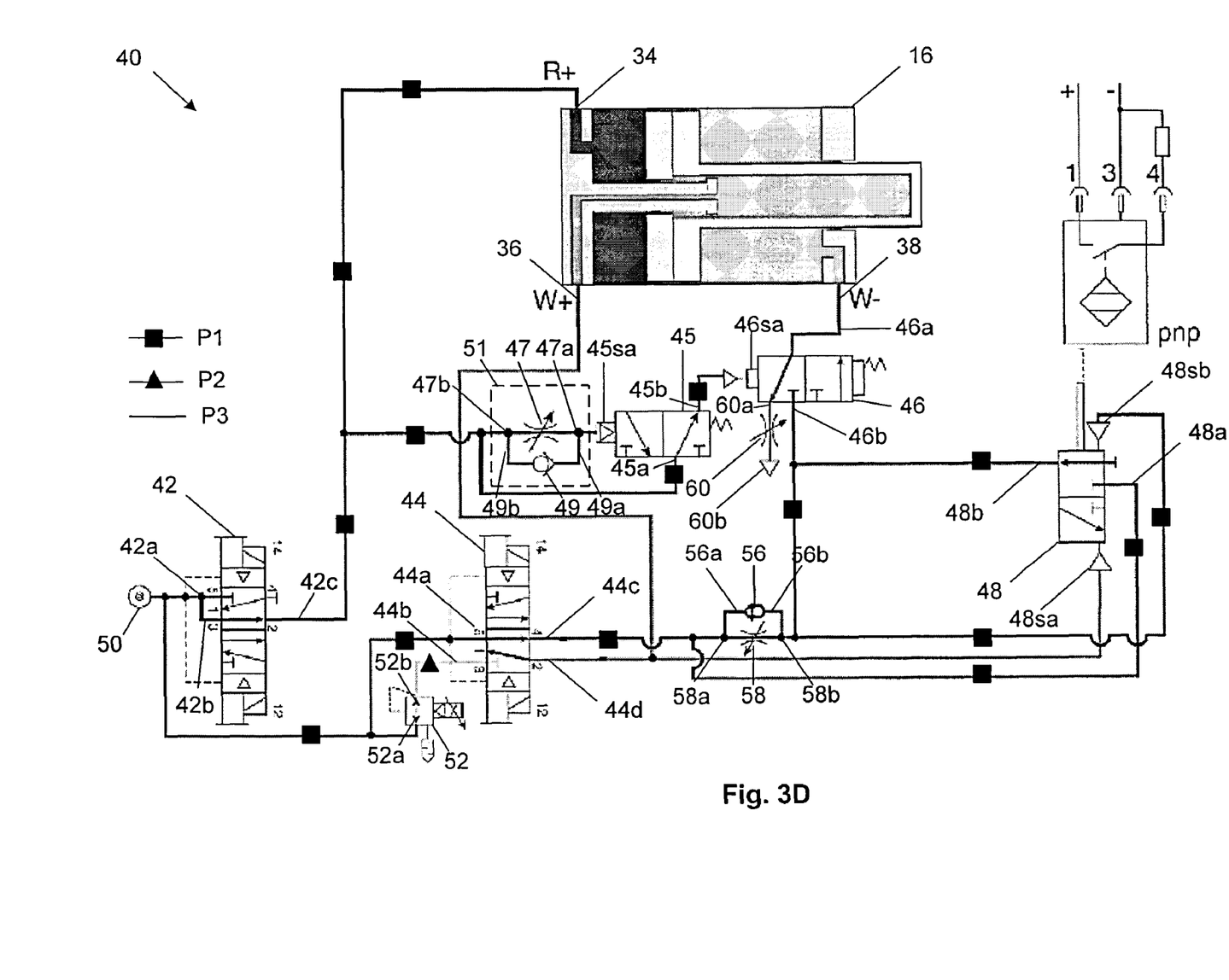
Figure 3E:
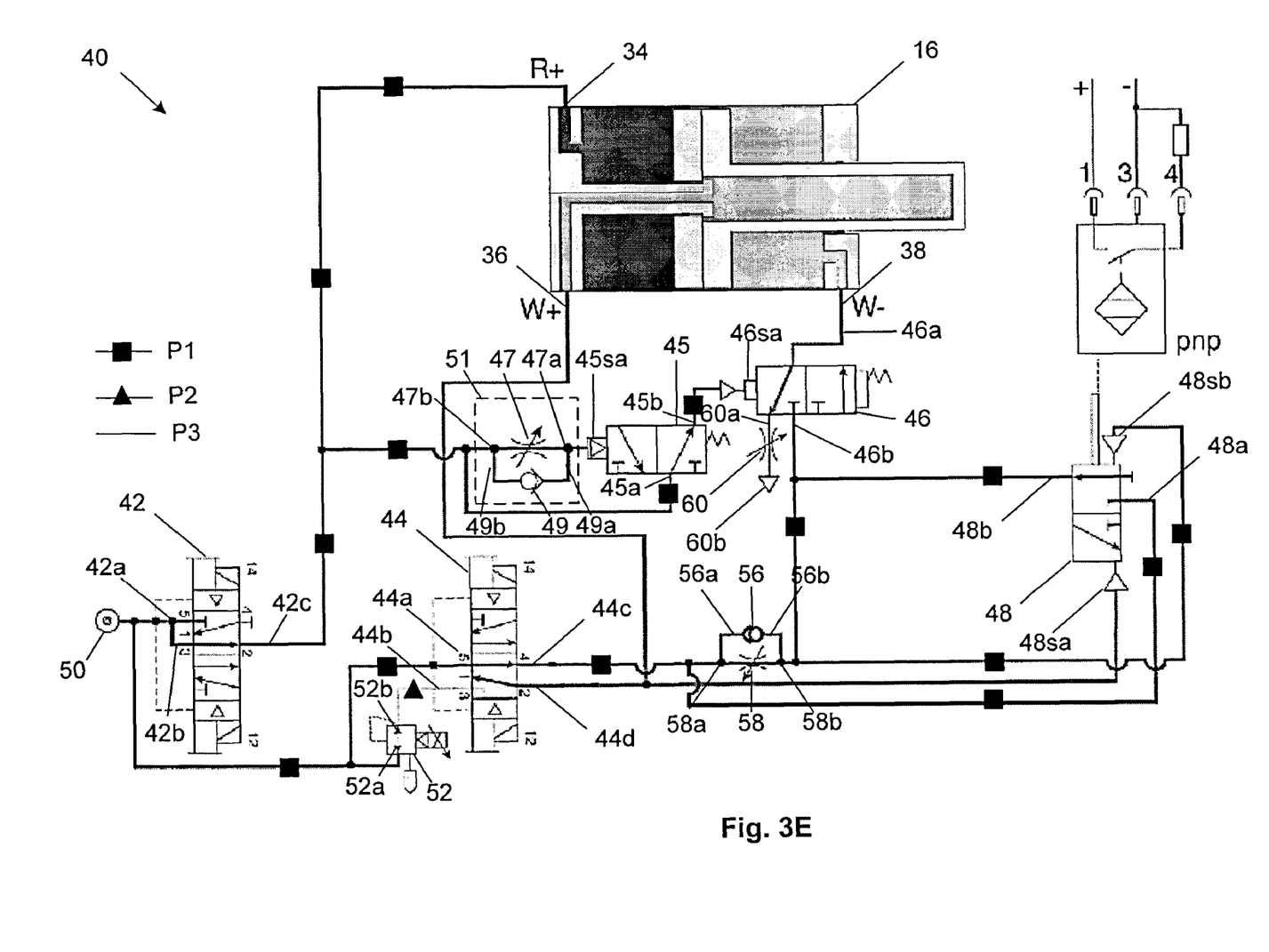

With further reference to FIGS. 3A-3J, there is shown a circuit 40 for operating the piston cylinder assembly 16, wherein FIG. 3A illustrates an exemplary starting position of the piston-cylinder assembly 16. The circuit 40 includes a first control valve 42 (pre-stroke/retract valve), second control valve 44 (weld valve), a first pneumatic valve 45 (teletimer), a second pneumatic valve 46 (quick exhaust valve), and a first proportional valve 48 (pressure sensing valve). The pre-stroke valve 42 and weld stroke valve 44, for example, may be electrically operated, while the teletimer 45, quick exhaust valve 46, and pressure sensing valve 48 may be pneumatically operated.

A fluid pressure supply 50, such as an air pressure supply or the like, provides a pressure P1 (e.g., line pressure) and is coupled to first and second ports 42a and 42b of the pre-stroke valve 42, and to a first port 52a of a pressure reducing valve 52. A third port 42c of the pre-stroke valve 42 is coupled to the first port 34 of the actuator 16 and to a first port 45a of teletimer 45. A second port 45b of the teletimer 45 is coupled to a pilot port 46sa of the quick exhaust valve 46. Additionally, first and second ports 47a and 47b of flow restrictor 47 are coupled to first and second ports 49a and 49b of check valve 49 (the flow restrictor 47 and check valve 49 represent a pneumatic timer 51, as discussed below). The first ports 47a and 49a of the flow restrictor 47 and check valve 49 are coupled to a pilot port 45sa of the teletimer 45, while the second ports 47b and 49b of the variable flow restrictor 47 and check valve 49 are coupled to the first port 34 of the actuator 16.

A first port 44a of the weld valve 44 is coupled to the pressure supply 50, and a second port 44b is coupled to the output 52b of the pressure reducing valve 52, which provides a pressure P2 (e.g., weld pressure), wherein P2 is less than P1. A third port 44c of the weld valve 44 is coupled to a first port 56a of check valve 56 and to a first port 58a of flow restrictor 58, and a fourth port 44d of the weld valve 44 is coupled to the second port 36 of the actuator 16. The check valve 56 effectively bypasses the flow restrictor 58 when fluid flow is traveling away from the weld valve 44, and implements the flow restrictor 58 when fluid flow is toward the weld valve 44.

The quick exhaust valve 46 has a first port 46a coupled to the third port 38 of the actuator 16, a second port 46b coupled to a second port 58b of flow restrictor 58, and a third port 46c coupled to a first port 60a of an optional variable flow restrictor 60 (the third port 46c may dump directly to ambient or pass through a sound reducing device prior to being dumped). A second port 60b of the second variable flow restrictor 60 is coupled to a third pressure source P3 (e.g., ambient pressure). As noted above, the pilot port 46sa of the quick exhaust valve 46 is coupled to the second port 45b of the teletimer 45. The quick exhaust valve 46, for example, based on pressure signals provided to the pilot port 46sa, will shuttle between one of two positions so as to change the coupling of the third port 38 of the actuator 16 (i.e., the first port 46a of the quick exhaust valve 46 is selectively coupled to the second port 46b or the third port 46c of the quick exhaust valve).

The pressure sensing valve 48 has a first port 48a coupled to the third port 44c of the weld valve 44, and a second port 48b coupled to the second port 58b of the flow restrictor 58. A first pilot port 48sa is coupled to the second port 36 of the actuator 16, and a second pilot port 48sb is coupled to the first port 48a of the pressure sensing valve 48.

The operation of the circuit 40 will now be described in more detail. FIG. 3A illustrates an initial position of the piston-cylinder assembly, wherein the first pressure chamber and second pressure chamber are at pressure P3 and the third pressure chamber is at pressure P1. FIGS. 3B-3E illustrate the pre-stroke motion of the piston-cylinder assembly 16, wherein the pre-stroke valve 42 is energized so as to provide pressure P1 of the pressure supply 50 to the third port 42c and, therefore, to the first port 34 of the actuator 16, thus pressurizing the first pressure chamber 24. The pressure P1 also is provided to the pneumatic timer 51, which acts as an "on-delay" timer, i.e., the timer provides an output at a predetermined time after receiving an input. Thus, when P1 is provided to the timer 51, an output signal is not immediately provided to the pilot port 45sa of the teletimer 45, and the teletimer 45 remains in its initial state providing pressure P1 to the pilot port 46sa of the quick exhaust valve 46. The pressure P1 at the pilot port 46sa of the exhaust valve 46 causes the exhaust valve 46 to shuttle so as to couple the third port 38 of the actuator 16 (and thus the third pressure chamber 30) to the flow restrictor 60, which meters or dumps (depending on whether the flow restrictor 60 is present) pressure P1 from the third chamber 30. Preferably, the flow restrictor 60 is set (e.g., adjusted) to have little or no flow resistance, thus creating little or no back pressure on the front side of the second piston 22 as the first and second piston move during the pre-stroke motion.

The weld valve 44, which initially is de-energized, provides pressure P1 at the third port 44c and exhausts the fourth port 44d. Thus, pressure P1 is provided to the first port 56a of the check valve 56, the first port 58a of the variable flow restrictor 58, and to the first port 48a of the pressure sensing valve 48 (the check valve effectively allows fluid to bypass the variable flow restrictor 58). Pressure P1 then is supplied from the second port 56b of the check valve 56 to the second port 48b and second pilot port 48sb of the pressure sensing valve 48. Further, the second pressure chamber 28 and the first pilot port 48sa, by virtue of being coupled to the fourth port 44d, also are dumped.

As a result, the first and second piston 20 and 22 move to the pre-stroke position at a relatively fast rate of speed, since there is little or no back pressure on the front side of the second piston 22 (i.e., no pressure in the third pressure chamber 30). When reaching the pre-stroke position, the first pressure chamber 24 may be at pressure P1, while the second and third pressure chambers 28 and 30 may be at pressure P3.

Figure 3F:
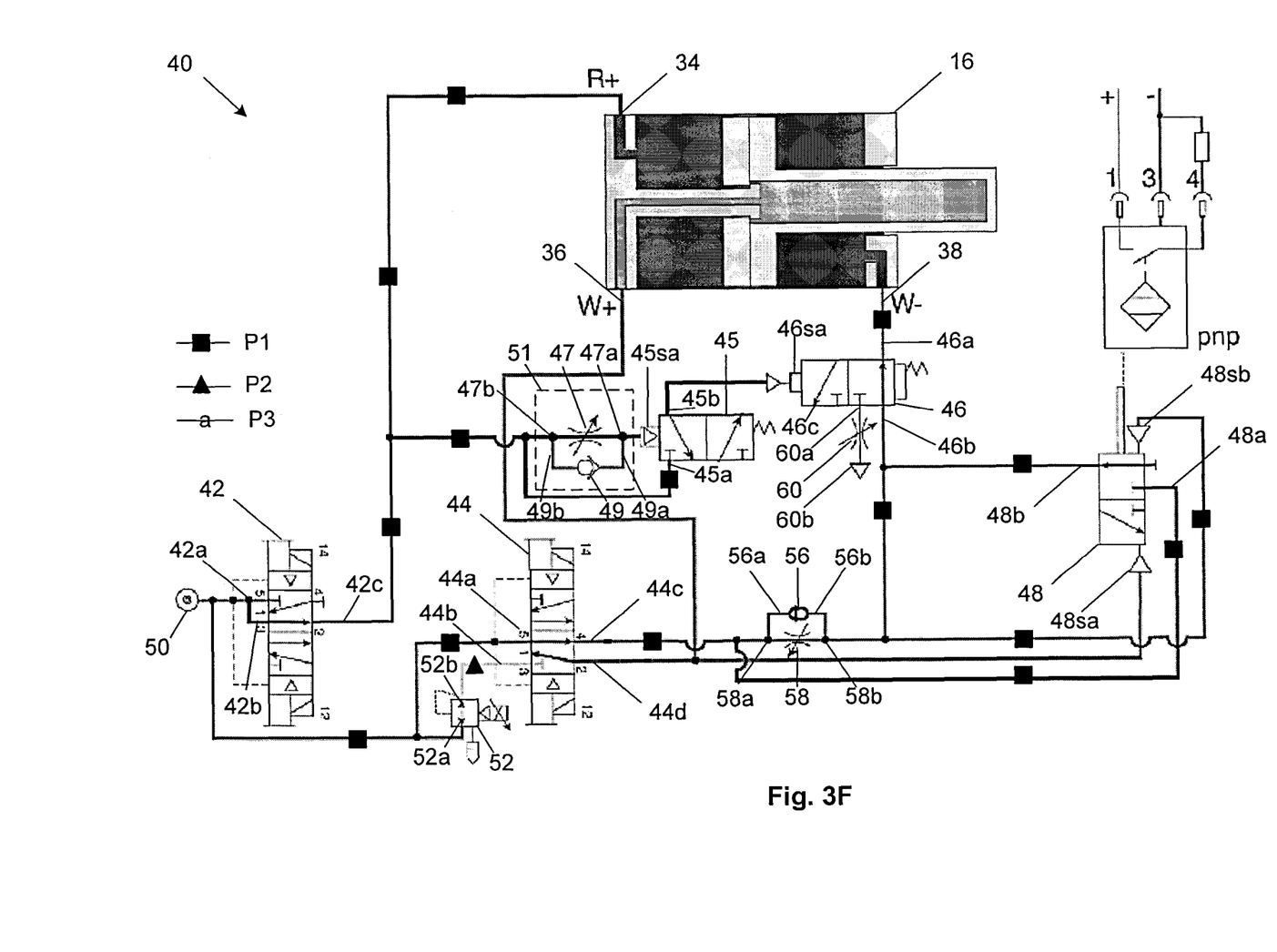

With further reference to FIG. 3F, as the first and second pistons 20 and 22 reach the pre-stroke position, the timer 51 times out and provides pressure P1 to the pilot port 45sa of the teletimer 45, which causes the teletimer 45 to shuttle so as to dump the second port 45b. As the second port 45b is dumped, the pressure signal at the pilot port 46sa of the quick exhaust valve 46 is removed, and the quick exhaust valve 46 shuttles to the home/default position, coupling the first and second ports 46a and 46b of the quick exhaust valve 46 and thereby providing pressure P1 to the third pressure chamber 30. As a result, a pressure in the third pressure chamber 30 and a pressure in the first pressure chamber 24 are substantially the same (they are both about P1). The third pressure chamber 30 is pressurized to provide metering air for the weld stroke motion, as described below.

Figure 3G:
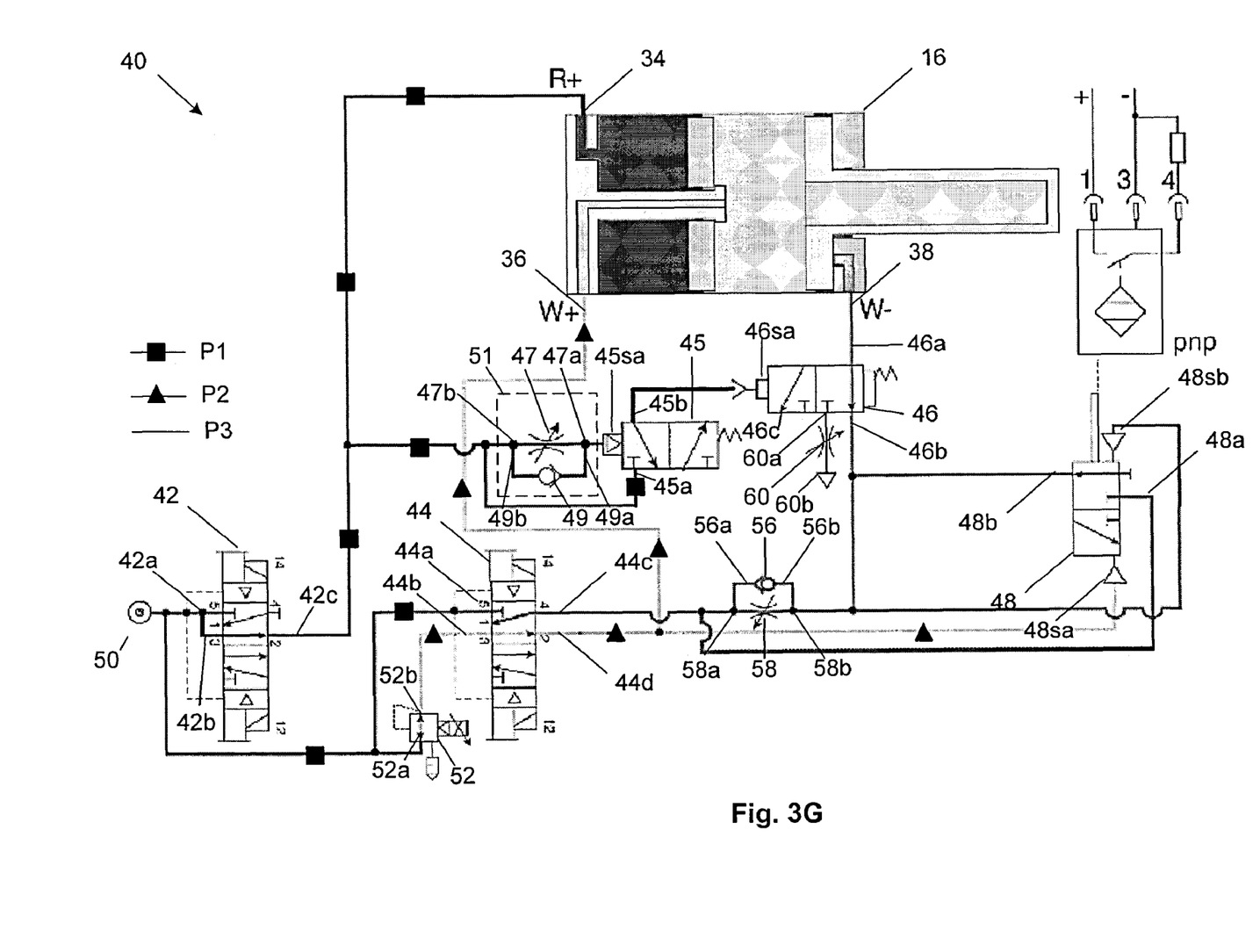

Next, the weld valve 44 is energized so as to exhaust the third port 44c and to couple the fourth port 44d to the second pressure supply P2, as shown in FIG. 3G. The second pressure P2 then is provided to the second port 36 of the actuator 16 and, thus, to the second pressure chamber 28. Further, since the third port 44c is exhausting, pressure in the third pressure chamber 30 is metered through the flow restrictor 58 and also is exhausted through the third port 44c. As a result, the second piston 22 moves to the weld position at a speed slower than the speed of the pre-stroke motion. As will be appreciated, the speed of the weld stroke can be adjusted by altering the pressure P2 and/or the flow rate of the flow restrictor 58.

Figure 3H:
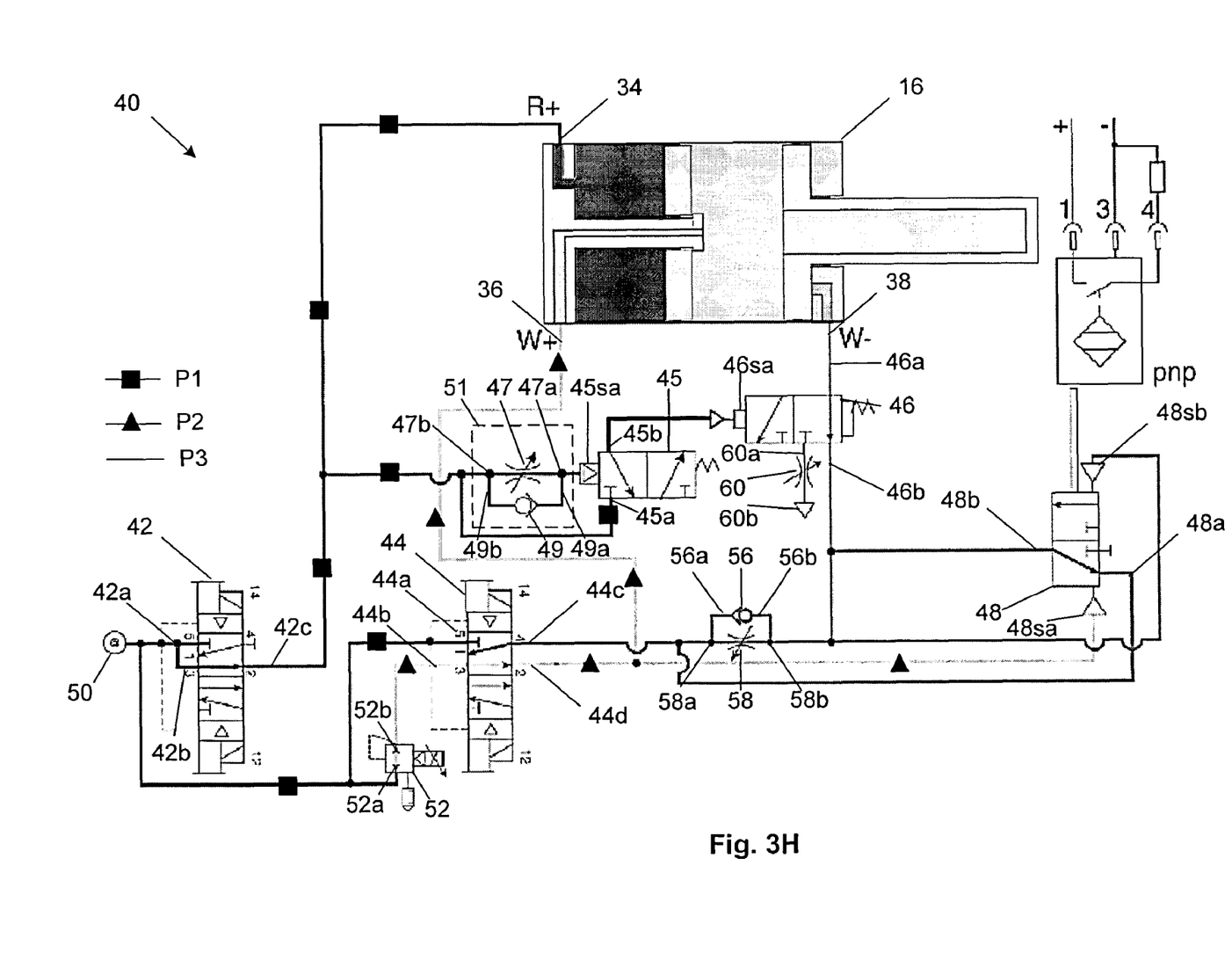

In addition, the first pilot port 48sa of the pressure sensing valve 48, by virtue of being coupled to the second port 36 of the actuator 16, is at the same pressure as the second pressure chamber 28 (e.g., P2). The second pilot port 48sb of the pressure sensing valve 48 is at the same pressure as the third pressure chamber 30 (pressure in the third pressure chamber is decaying from P1 in FIG. 3G). When the pressure in the second pressure chamber 28 reaches a predetermined level (e.g., 80 percent of a target weld pressure), the pressure sensing valve 48 shuttles so as to couple the second port 46b of the quick exhaust valve 46 (and thus the third pressure chamber 30) to the third port 44c of the second valve, thus dumping pressure from the third pressure chamber 30 as shown in FIG. 3H. In other words, since contact has been made between the tips 18 and the work piece, the pressure in the third pressure chamber 30 is dumped to enable the clamping force applied between the tips 18 and the work piece to build as fast as possible. Further, as the pressure sensing valve 48 shuttles, a signal can be provided to a control module (not shown) to initiate the weld command (i.e., begin the flow of current through the electrodes, tip and work piece). This signal provides confirmation that sufficient pressure is present for initiating a weld, without relying on timers set in control modules or the like.

Figure 3I:
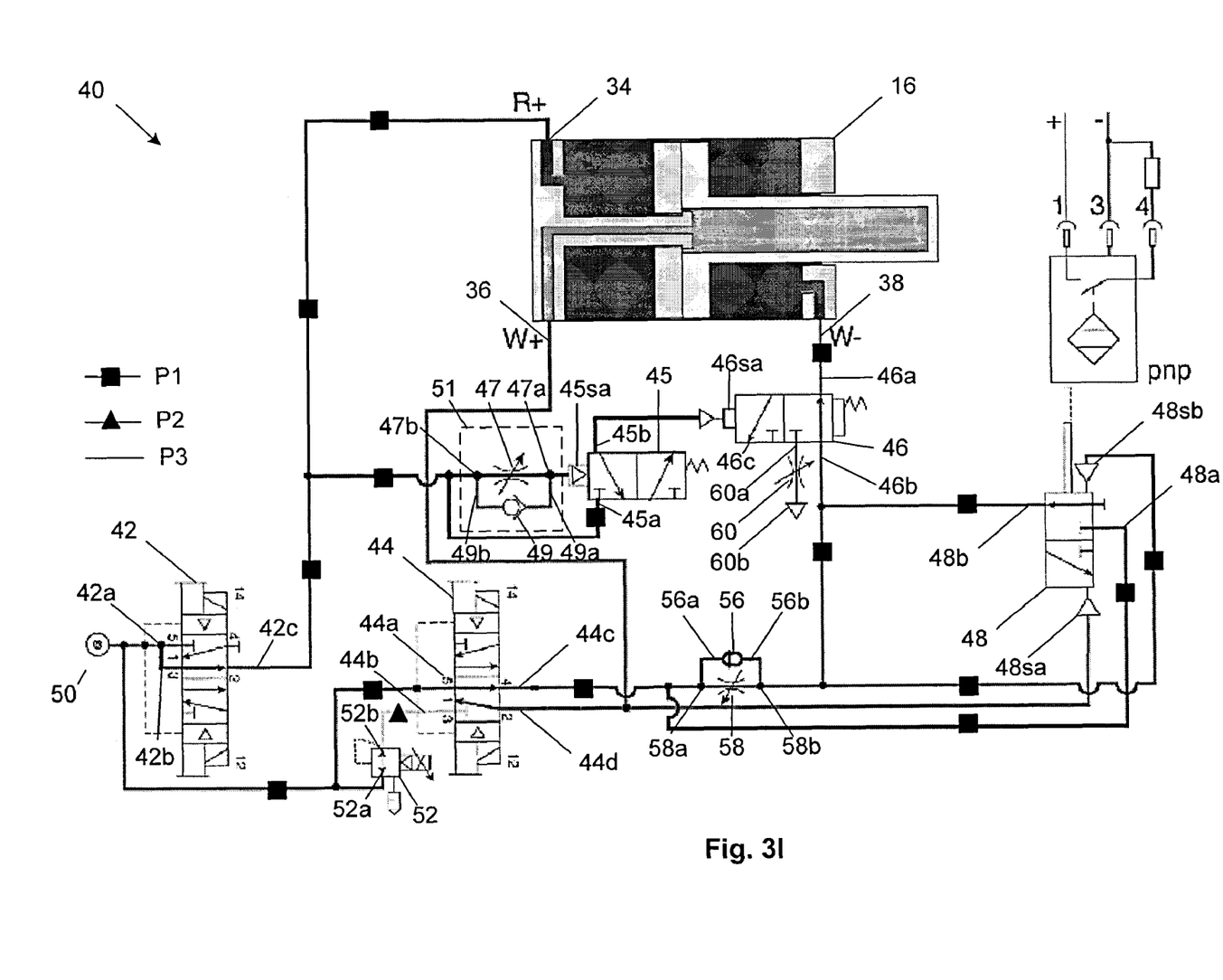

A predetermined time after the weld command has been issued, the weld valve 44 is de-energized so as to couple the third port 44c to the pressure supply P1, and the fourth port 44d is exhausted as shown in FIG. 3I. Further, the first pilot port 48sa and the second pressure chamber 28, which are coupled to the fourth port 44d, also are exhausted (dumped), while the second pilot port 48sb is provided with pressure P1 via check valve 56. This causes the pressure sensing valve 48 to shuttle so as to decouple the second port 46b of the quick exhaust valve (and thus the third pressure chamber 30) from the fourth port 44d of the weld valve 44 (i.e., the third pressure chamber is no longer dumped). As a result, the third pressure chamber 30 is pressurized while the second pressure chamber 28 is dumped, causing the second piston 22 to return to the pre-stroke (also referred to as retract) position as fast as possible.

Figure 3J:
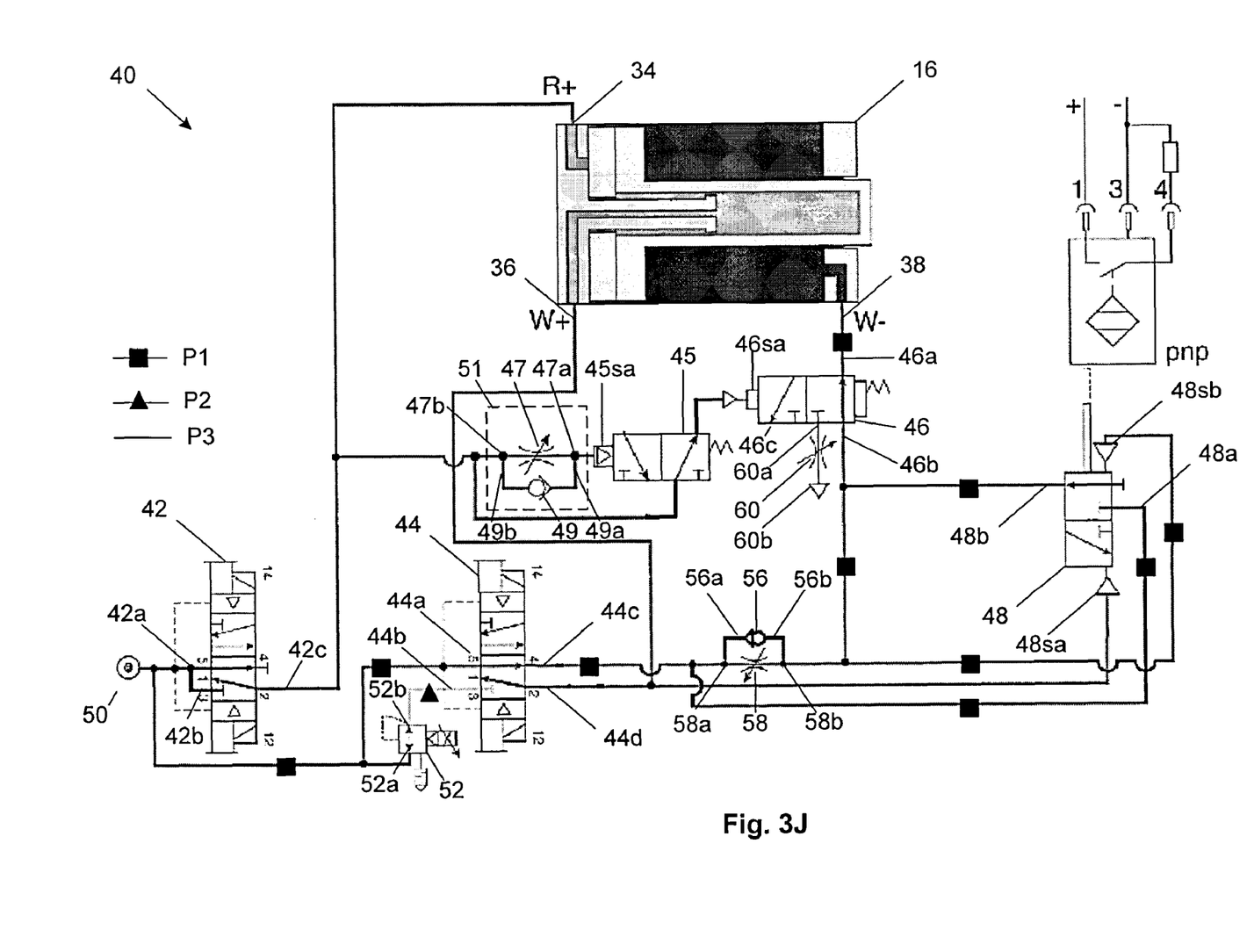

Once the second piston 22 is retracted, the pre-stroke valve 42 is de-energized so as to exhaust the third port 42c (and thus dump the first pressure chamber 24), as shown in FIG. 3J. With pressure P1 in the third pressure chamber 30 and the first and second pressure chambers 24 and 28 being dumped, the first and second piston 20 and 22 rapidly return to the starting position. The process then may be repeated for each additional weld operation.

Figure 4A:
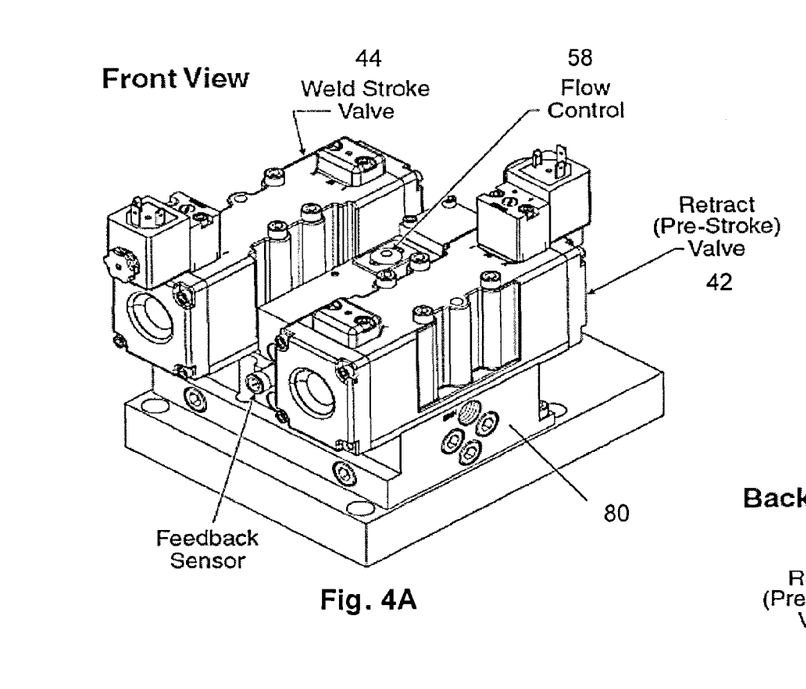
FIGS. 4A and 4B are front and back views of an exemplary block incorporating the circuit of FIG. 3A-3J in accordance with the invention.
Figure 4B:
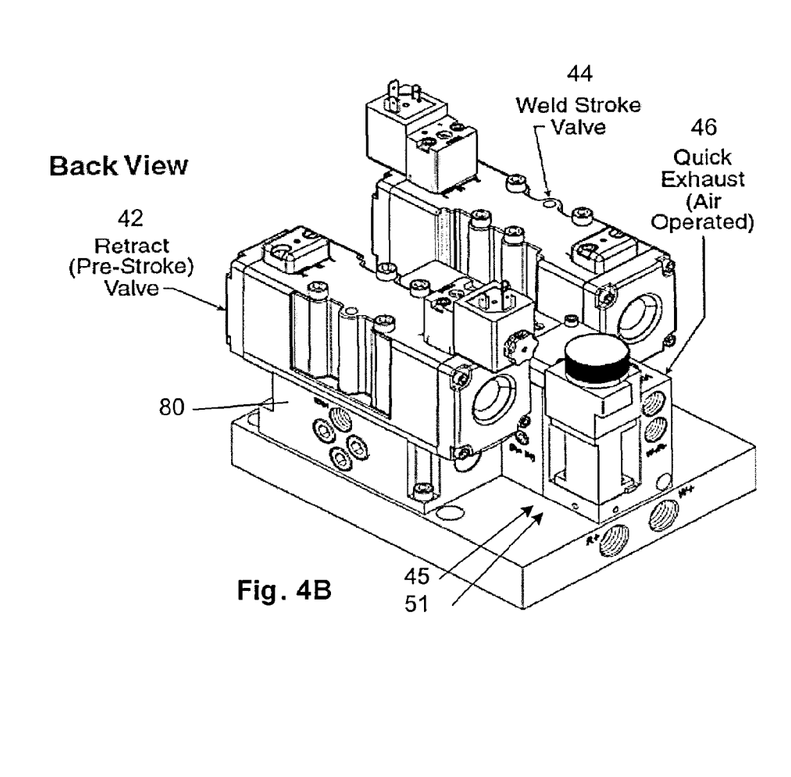

Referring now to FIGS. 4A and 4B, there is shown front and back views of an exemplary valve block 80 that includes the weld circuit 40. Mounted on the block are a pre-stroke valve 42, weld stroke valve 44 and quick exhaust valve 46. The block may be designed to conform to accepted standard configurations within the art (e.g., ISO). In other words, ports on the block 80 may conform to accepted standards (e.g., size, location, etc.) such that any valve that conforms to the same standard may be used with the block 80, regardless of the manufacturer of the block and/or valve. Additionally, one or more components (e.g., valves, regulators, etc.) may be integrated into the block 80.

The block 80 may be used to convert an existing application into an application that includes the features of the circuit 40. For example, a user may have a two-station manifold integrated into an existing system. The user may wish to improve the performance of the system, without significant redesign and/or down time. One approach that may be implemented is to simply remove the existing weld valves and existing weld block from the manifold, place the weld block 80 on the manifold, and then attach the valves to the block 80. Then, the weld valves can be placed on the block 80, thereby incorporating the benefits of the circuit 40 into the existing system (.e.g., the block may be sandwiched between the manifold and the valves, wherein the block includes the ports and circuitry described herein). Further, the block 80 can be configured so as to convert a three-port piston-cylinder assembly into a four-port piston-cylinder assembly, and vice versa. For example, the quick exhaust valve 46 can be mounted to a back side of the block (e.g., via fasteners). If the quick exhaust valve 46 is removed from the block 80, the block converts from a three-port weld block to a four port weld block. Further detail with respect to the block 80 is provided in document WCS-SIF-01-Pneumatic Spotwelding Control Systems Training and Maintenance Manual, issued May 2006, which is incorporated by reference in its entirety.

The invention described herein can reduce the cycle time of a welding operation. More specifically, the dual pressure system with the quick exhaust valve 46 enable the pre-stroke/retract and return motions to occur at a relatively high speed and, thus, minimize cycle times. Test have shown that cycle times can be reduced by 100 milliseconds or more depending on the piston-cylinder stroke and/or bore size. Further, the tips are brought together under low impact, and immediately after contact between the electrodes and the work piece, the press force builds up instantly. A signal then is generated to start the weld cycle, which enables a user to reduce the squeeze time down as low as one cycle, thereby providing a significant time savings per weld.

Low impact of the electrodes is advantageous for a number of reasons. For example, the slow contact speed of the electrodes with the work piece results in less wear and tear on the electrode tips (e.g., up to 3 times longer life). Additionally, the slow contact speed does not cause bouncing of the electrodes on the work piece, which allows the welding process to start immediately and, thus, reduce cycle times. Further, the slow contact speed creates less noise compared to conventional systems. These advantages are realized with the above discussed cycle time reductions.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of controlling a piston-cylinder assembly for a welding apparatus, said piston-cylinder assembly including a plurality of pressure chambers, wherein said piston-cylinder assembly is operatively coupled to at least one welding electrode of said welding apparatus so as to effect movement of said electrode in a pre-stroke and weld motion, comprising:
    for pre-stroke motion using a first valve to connect a first fluid pressure to a first port of the piston-cylinder assembly, said first port in communication with a first pressure chamber so as to effect the pre-stroke motion of the electrode;
    for weld stroke motion using a second valve to connect a second fluid pressure to a second port of the piston-cylinder assembly, said second port in communication with a second pressure chamber so as to effect the weld stroke motion of the electrode, wherein the second fluid pressure is different from the first fluid pressure;
    upon connecting the first fluid pressure to the first port, using a third valve to simultaneously connect a third fluid pressure to a third port of the piston-cylinder assembly, said third port in communication with a third pressure chamber, wherein a pneumatic timer is coupled to the third valve, and the third valve is operative to connect the first pressure to the third pressure chamber when the pre-stroke motion is complete, and the pneumatic timer controls a time period that fluid pressure is dumped from the third pressure chamber during the pre-stroke motion;
    upon completion of the pre-stroke motion of the electrode, connecting the first fluid pressure to the third port of the piston-cylinder assembly; and
    dumping fluid pressure from the third pressure chamber when a clamping force applied by the electrodes on a work piece satisfies a predetermined threshold.

2. The method of claim 1, wherein connecting the third port to the third fluid pressure includes dumping a flow rate of fluid from the third pressure chamber.

3. The method of claim 1, wherein the third fluid pressure is ambient air pressure.

4. A system for operating a piston-cylinder assembly for a welding apparatus, said piston-cylinder assembly including a plurality of pressure chambers, wherein said piston-cylinder is operatively coupled to at least one welding electrode of said welding apparatus so as to effect movement of said electrode in a pre-stroke and a weld motion, comprising:
    a first fluid pressure source for providing a first fluid pressure;
    a second fluid pressure source for providing a second fluid pressure, wherein the second fluid pressure is less than the first fluid pressure;
    a third fluid pressure source for providing a third fluid pressure, wherein the third fluid pressure is less than the second fluid pressure;
    a first valve coupled to a first pressure chamber and operative to selectively provide the first fluid pressure or third fluid pressure to the first pressure chamber;
    a second valve coupled to a second pressure chamber and operative to selectively provide the second fluid pressure or third fluid pressure to the second pressure chamber;
    a third valve coupled to a third pressure chamber and operative to selectively provide the third fluid pressure or the first fluid pressure to the third pressure chamber, wherein the third valve is operative to connect the third fluid pressure to the third pressure chamber during pre-stroke motion of the piston-cylinder assembly; and
    a pneumatic timer coupled to the third valve, wherein the pneumatic timer controls a time period that fluid pressure is dumped from the third pressure chamber during the pre-stroke motion,
    wherein the third valve is operative to connect the first pressure to the third pressure chamber when the pre-stroke motion is complete, and to dump fluid pressure from the third pressure chamber when a clamping force applied by the electrodes on a work piece satisfies a predetermined threshold.

5. The system of claim 4, wherein the third pressure source is ambient pressure.

6. The system of claim 4, wherein the piston-cylinder assembly is at least one of a two-port, three-port or a four-port piston-cylinder assembly.

* * * * *